United States Patent [19]
Traylor

[11] Patent Number: 5,176,165
[45] Date of Patent: Jan. 5, 1993

[54] AIR GAP APPARATUS

[76] Inventor: Paul L. Traylor, 16591 Milliken Ave., Irvine, Calif. 92714

[21] Appl. No.: 781,751

[22] Filed: Oct. 23, 1991

[51] Int. Cl.⁵ ............................................... E03C 1/12
[52] U.S. Cl. .................... 137/216.1; 137/216; 137/247.11; 137/515; 137/515.5; 137/519.5
[58] Field of Search ................ 137/216, 216.1, 247.11, 137/515, 515.5, 519.5

[56] References Cited

U.S. PATENT DOCUMENTS

| | | |
|---|---|---|
| 3,716,143 | 2/1973 | Clark . |
| 3,786,924 | 1/1974 | Huffman . |
| 3,856,672 | 12/1974 | Boswinkle et al. . |
| 4,071,445 | 1/1978 | Katayama et al. . |
| 4,646,755 | 3/1987 | Traylor . |
| 4,771,485 | 9/1988 | Traylor . |
| 4,812,237 | 3/1989 | Cawley et al. . |
| 4,856,121 | 8/1989 | Traylor . |
| 4,917,847 | 4/1990 | Solomon . |
| 4,944,877 | 7/1990 | Maples . |
| 4,967,784 | 11/1990 | Barhydt et al. ................ 137/216 |
| 5,006,234 | 4/1991 | Menon et al. . |

Primary Examiner—Gerald A. Michalsky
Attorney, Agent, or Firm—J. F. McLellan

[57] ABSTRACT

An air gap apparatus particularly adapted for use in reverse osmosis (RO) units in which reject water must be carried off to a drain line. The apparatus is adapted for incorporation in an RO unit as original equipment or for addition later as an after market item. It provides air gap protection against backsiphoning, and also includes a deflector wall and supplemental opening for shunting to atmosphere any high velocity backflow from the drainage line. Various forms of check valves are disclosed for use with the air gap apparatus to provide further protection against contamination of the potable water system by backflows, the check valves being adapted in certain embodiments for connecting together conduit sections within which the check valves have been installed. Also, a compact and inexpensive form of trap is disclosed for use in systems which do not include a conventional drain trap.

21 Claims, 6 Drawing Sheets

AIR GAP APPARATUS

BACKGROUND OF THE INVENTION

1. Field of the Invention

The present invention relates to a vacuum breaker or air gap apparatus for use in liquid dispensing equipment, and particularly for use in water purification and dispensing systems such as reverse osmosis (RO) units.

2. Description of the Prior Art

In a reverse osmosis water dispenser, the source or inlet water passes through a membrane or the like and emerges as purified or potable outlet water. The water that is retained is waste or reject water which more or less constantly flows into the associated drainage system. This arrangement presents a risk that a drainage backflow can develop and contaminate the RO system.

Regardless of the particular type of water dispenser used, whether reverse osmosis or otherwise, if there is drainage into a sewer system, plumbing codes require use of an approved backflow prevention device, such as a vacuum breaker or air gap, to prevent backsiphoning or backflow of contaminated water into the dispensing system.

Contaminated water is considered to be any water located downstream of the potable water source, and an acceptable air gap apparatus therefore must be capable of preventing entry of such downstream water into the potable water system under any conceivable condition of operation.

In an air gap backflow prevention device, plumbing codes typically specify an air gap or vertical height opening of at least one inch. This is effective to prevent backsiphoning back flow in most situations, but there are instances when a pressure differential can develop so quickly that a high velocity flow of contaminated water bridges the air gap and passes into the potable water system.

Use of check valves would be one means for preventing such bridging backflow, but used alone they are not fail safe and are normally not allowed by most plumbing codes. This is because foreign matter in the backflow can clog such a valve and prevent it from seating properly.

Blockage of drain lines and resultant backflow has recently become more common because of the increasing use of water conservation devices such as low water consumption toilets and restricted flow rate shower heads. These reduce the rate of water flow and increase the susceptibility of drain lines to blockage and backflow. Then even a relatively slow rate of backflow in larger size drain lines becomes a high velocity backflow in the smaller size conduits of the potable water system.

Some manufacturers of RO systems fit their equipment with air gap devices, but most do not. Those that are provided do not always comply with plumbing codes, particularly the vertical air gap requirement. Further, such devices as are originally installed or which are later added by the RO unit installer do not provide both satisfactory downstream flow rates and protection against a forcible, high velocity upstream backflow.

Many prior art devices are aesthetically unappealing and relatively incessible, typically being cramped into a small space with the dispensing faucet.

What is needed is an inexpensive, relatively compact, non-integral or separate air gap device in kit form, adapted for mounting in an external location for accessibility, providing adequate flow rates and preferably including associated check valves for protection against pressurized backflows, and an associated trap to prevent entry of drainage system odors into the household. Such a kit would make installation within an RO system relatively easy, either as original equipment or as an after-fitted item. The trap portion of such a kit would also be useful in ordinary water cooler applications where it is desired to direct to a drain line the small quantity of water which collects in the drain cup, but where a connection to the building drain line upstream of the existing trap would be inconvenient or unsightly, or where the location of the existing trap is not known. With the present trap, a simple connection could be made to the building drain line at whatever point it was convenient.

My U.S. Pat. No. 4,646,775, issued Mar. 3, 1987, discloses an air gap apparatus capable of preventing back flow from a drain line, but the device employs a form of check valve which, as indicated above, is not permitted by most plumbing codes, and the device is not optimally configured for RO unit applications.

My U.S. Pat. Nos. 4,771,485 and 4,856,121, issued Sep. 20, 1988 and Aug. 15, 1989, respectively, also disclose forms of air gap apparatus, but the disclosed devices are designed for incorporation in a faucet fixture, and do not include any unique or special structure to prevent high velocity backflow of contaminated water into the fixture, other than a one inch air gap.

SUMMARY OF THE INVENTION

According to the present invention, an air gap apparatus is provided which not only includes an air gap for preventing drainage system backsiphoning and backflow into a potable water dispenser, but which also includes a diverter passage and flow deflector to safely channel to the exterior of the air gap apparatus any high velocity backflow which may occur. It preferably also includes an auxiliary vent passage as a backup air gap.

The air gap apparatus can be made of plastic or other corrosion resistant material which can be inexpensively molded. It includes end fittings for easy attachment of the apparatus to the conduits or plumbing of a dispenser.

The apparatus is preferably used in conjunction with an improved form of check valve to provide additional protection against backflow caused by pressure differentials. If desired, it may also include a holding tank to collect RO waste water, and a buffer tank to receive any backflow water which may have gotten by the check valve.

The apparatus can also be used in combination with a unique vented, relatively small trap which is quickly and easily formed out of flexible plastic conduit. The conduit is formed into a loop to define the trap. A special coupling is provided to both splice the conduit where required, and to provide a vent at the proper location. Further, a loop mounting bracket enables the loop element of the trap to be quickly and easily attached to an adjacent wall or the like in any of several diameters and orientations.

The air gap apparatus, check valve or valves, and trap can be conveniently marketed as an integrated kit for use by a water dispenser manufacturer, or for use by an installer for after fitting to a water dispenser. The kit could thus be a standard kit for universal association with most water dispensers, and with assurance that local plumbing codes would be met.

As will be seen, certain embodiments of such a kit can be used to enable all or a predetermined portion of the waste water from an RO system to be collected and later used as "gray" water for watering plants and shrubbery.

Other features and advantages of the invention will become apparent from the following detailed description, taken in conjunction with the accompanying drawings which illustrate, by way of example, the features of the invention.

BRIEF DESCRIPTION OF THE DRAWINGS

FIG. 18 is a perspective view of a trap bracket for holding and mounting the conduit of the trap of FIG. 17 for attachment to a wall or the like;

FIG. 19 is a view taken along the line 19—19 of FIG. 18;

DESCRIPTION OF THE PREFERRED EMBODIMENTS

The present air gap apparatus is useful by itself, or in combination with special check valves and traps, depending upon the particular liquid dispenser application. A number of general arrangements will be described to illustrate this capability.

Figure 1:
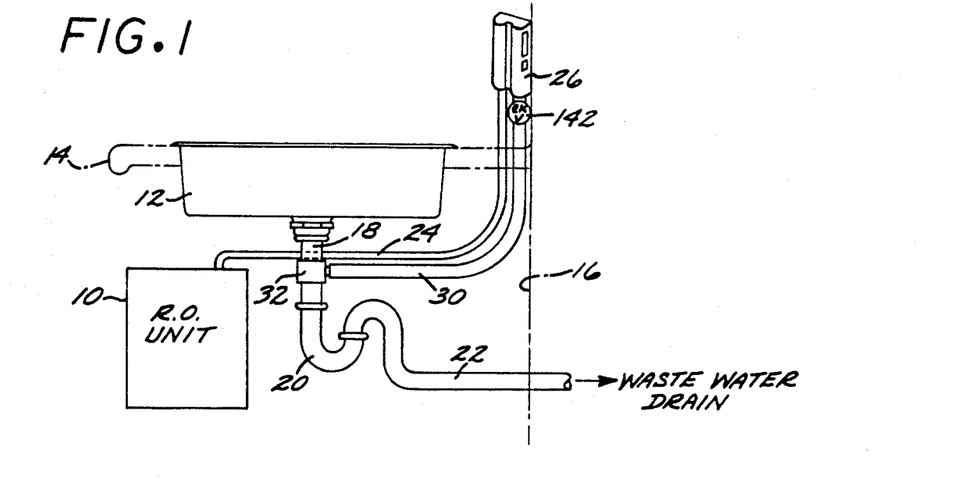
FIG. 1 is a schematic view of the present air gap apparatus used in an undercounter reverse osmosis (RO) system, in combination with improved check valves.

Referring now to FIG. 1, the liquid dispenser system illustrated is an under counter reverse osmosis (RO) unit 10 located beneath a kitchen sink 12 mounted in a counter 14 which is suitably fixed to a wall 16. The sink 12 empties into a drain pipe or conduit 18 which is connected to a conventional "P" trap 20, which in turn is connected to a waste water drain line 22.

Although not illustrated, the potable water output of the unit 10 is connected by a suitable conduit to a usual faucet or spigot located somewhere on the counter. The reject or waste water from the unit 10 passes into an air gap inlet conduit 24 which is coupled to the air gap apparatus 26 of the present invention.

The air gap apparatus 26 is fastened to the adjacent wall 16 and empties into an air gap outlet conduit 30 which is clamped upon the drain conduit 18 by a cylindrical fitting 32. The conduit 18 is provided with an opening (not shown), and the fitting 32 accepts the water from the outlet conduit 30 and passes it into the opening. A suitable pressure seal (not shown) prevents water leakage out of the fitting 32.

Figure 2:
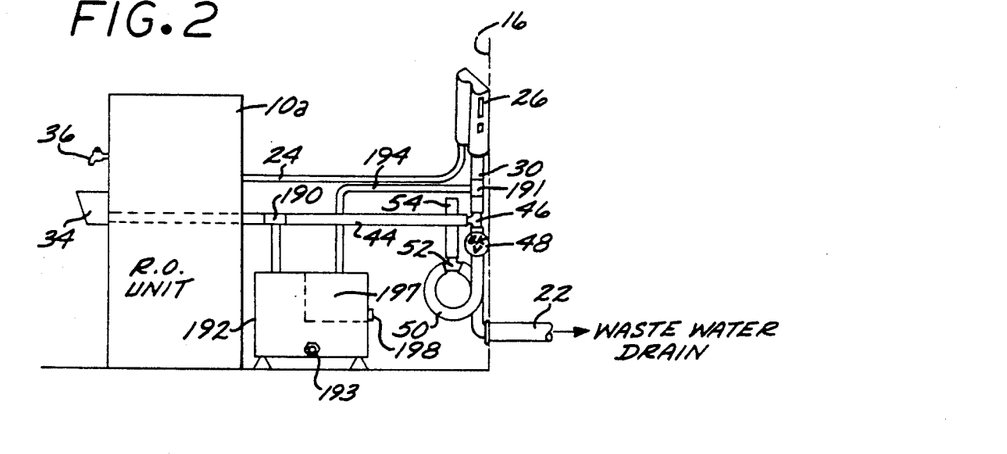
FIG. 2 is a schematic view of the air gap apparatus used in a reverse osmosis water cooler system in combination with a specially designed trap, and in combination with a holding tank or a buffer tank.

Another arrangement for which the air gap apparatus 26 is suited is illustrated in FIG. 2. In this case the RO unit is a free standing water cooler similar in function to the RO unit 10 of FIG. 1. Other components of the arrangement are also similar, and in some instances identical. Where there is identity the same reference numerals are used. Where there is simply similarity of operation or structure the same reference is used with a lower case "a". Likewise, with respect to the arrangement of FIG. 3 to be described, the lower case "b" will be used.

In the arrangement of FIG. 2, the RO unit 10a includes the air gap inlet conduit 24 connected to the air gap apparatus 26 as before, but the spillage cup 34 beneath the faucet or spigot 36 empties into a conduit 44. The conduit 44 is connected to a "T" fitting 46 having one of its legs coupled to the air gap outlet conduit 30, and the other leg coupled to a check valve 48. The check valve 48 leads to a trap 50 which empties into the waste water drain 22. The trap 50 includes a special vent "T" fitting 52 which vents to atmosphere through a vertically oriented vent tube or stand pipe 54.

If it is desired to collect the waste or "gray" water from the RO unit, a T-fitting 190 is placed in fluid communication with the conduit 44 to tap off the waste water for collection in a holding tank 192. Such water can be tapped off for gardening use, for example, by connecting a garden hose (not shown) to a garden hose outlet 193 provided in the tank 192.

Once the tank 192 is full the overflow will pass to the drain line 22 via conduit 44, T-fitting 46, check valve 48 and trap 50. Conduit 194 extends from the top of the tank and empties through a T-connection 191 into the air gap outlet conduit 30. Although not illustrated, if desired for system flexibility, either or both the fittings 190 and 191 may contain adjustable restrictors to shunt or collect only a predetermined portion of the waste water flowing through the T-fitting 46.

Alternatively, a dashpot or buffer type of tank 197 can be coupled to the T-fitting 191 through the conduit 194. The purpose of this arrangement is to capture in the tank 197 any high velocity backflow which may get past check valve 48, and which does not pass to atmosphere through the vent pipe 54. This backflow passes through the conduit 194 into the tank, and thereafter flows to drain line 22 through the conduit 198.

As will be apparent, the size and location of the tanks, and the relative rates of flow into and out of the tanks can be varied as required by the particular application.

Figure 3:
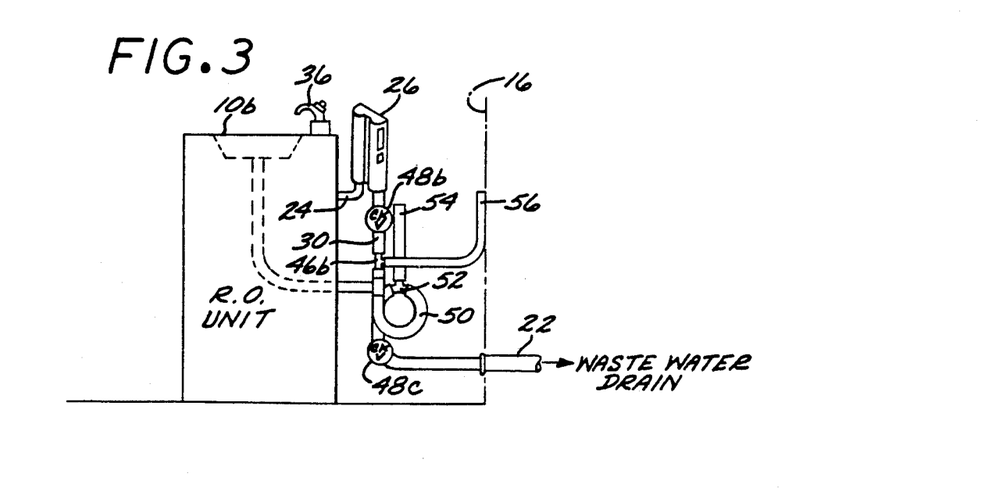
FIG. 3 is a schematic view similar to FIG. 2, but illustrating the air gap apparatus used in combination with a different form of check valve and a venting connection.
Figure 4:
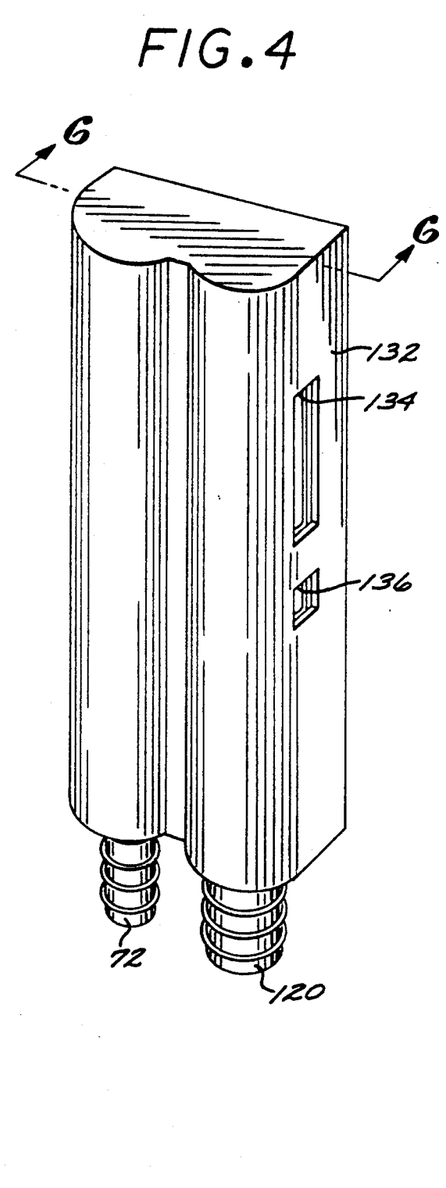
FIG. 4 is an enlarged front perspective view of the air gap apparatus of FIG. 1.
Figure 5:
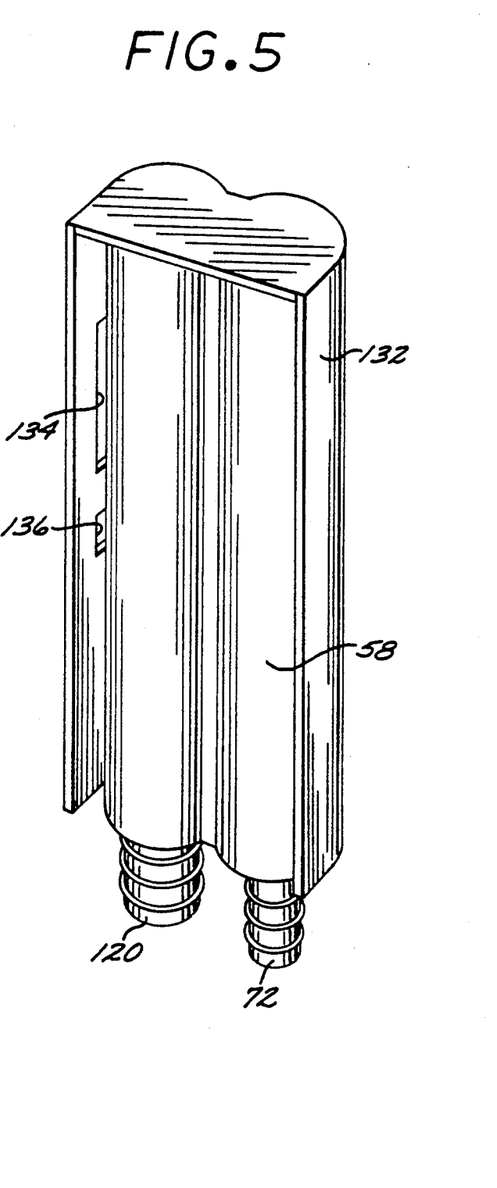
FIG. 5 is an enlarged rear perspective view of the air gap apparatus of FIG. 1.

In the arrangement of FIG. 3, the RO unit 10b is a free standing unit which includes a discharge spigot 36 and a reject water air gap inlet conduit 24 coupled to the air gap apparatus 26. The apparatus 26 includes an integral check valve 48b connected by the outlet conduit 30 to "T" fitting 46b.

A vent pipe 56 is connected to the fitting 46b, and extends laterally and upwardly for mounting to the wall 16. If desired, the pipe 56 could be free standing, or it could be mounted to the inside or the outside of the RO unit. The trap 50 is also coupled to the fitting 46b and, as in the arrangement of FIG. 2, includes a stand pipe 54, and empties into the drain line 22.

Use of the vent pipe 56 and fitting 46b is optional, and their location and height can be changed. The fitting 46b can also be located between the apparatus 26 and the check valve 48b. Further, the upper ends of the vent pipe 56 and the stand pipe 54 are preferably located lower than the air gap openings in the apparatus 26.

As seen in FIGS. 4-9, one embodiment of the present air gap apparatus 26 comprises a vertically elongated housing 58 which, like the other components of the apparatus 26, is preferably molded out of suitable light weight, high strength plastic material. The housing 58 is characterized by an outer wall 60 integral with a central wall 62 which together define a pair of adjacent, open ended and generally cylindrical left and right chambers 64 and 66, respectively. The inner surfaces of the walls 60 and 62 at the base of the left chamber 64 include a reduced diameter portion defining a shoulder 68. Similarly, the walls at the base of the right chamber 66 include a reduced diameter portion defining a shoulder 70.

Figure 6:
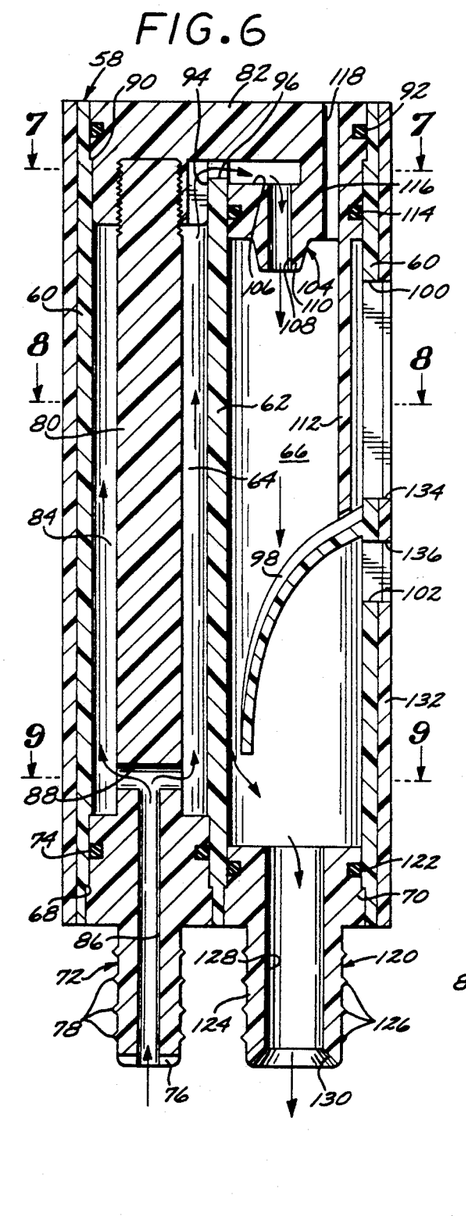
FIG. 6 is an enlarged longitudinal cross sectional view of the air gap apparatus.
Figure 7:
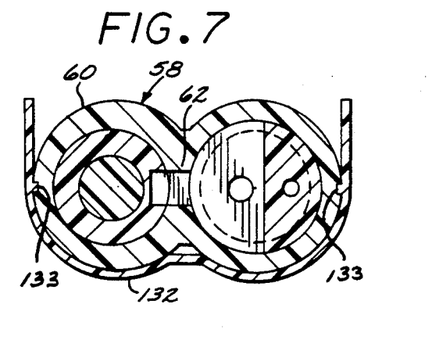
FIG. 7 is a view taken along the line 7—7 of FIG. 6.

The lower end of the left chamber 64 is closed by a cylindrical port or inlet fitting 72 having an annular flange which seats against the shoulder 68. The fitting 72 also has an annular groove which receives a sealing O-ring 74 to provide a watertight fit between the fitting 72 and the housing 58.

The inlet fitting 72 includes a depending tubular connector portion 76 which has a plurality of longitudinally spaced apart gripping ridges 78. The ridges can be V-shaped, as illustrated, but can also be made of rounded or square cross section, if desired. Forcible sleeving of the air gap inlet conduit 24 (see FIG. 1-3) onto the connector portion 76 causes the ridges 78 to press into the flexible plastic material of the conduit. Since the waste water discharge from an RO system is at a relatively low pressure and rate of flow, the use of such ridges is a relatively inexpensive and more than adequate means for establishing a fluid tight fit.

The inlet fitting 72 also includes an integral, upwardly extending and generally cylindrical tie member 80 which extends to the top of the left chamber 64. The upper end is threaded for connection to a housing closure 82, as will be seen. Further, the diameter of the tie member 80 is less than the internal diameter of the left chamber 64 so that an annular passage 84 is defined.

The inlet fitting 72 includes a longitudinal inlet passage 86 which extends up into the lower portion of the tie member 80, at which point it becomes a lateral passage 88 which opens into the annular passage 84.

The upper closure 82, as best seen in FIG. 6, is configured to fit within the upper ends of the cylindrical chambers 64 and 66. The inner walls of these upper ends include a continuous shoulder 90 upon which a complemental flange of the closure seats to locate the closure 82 in position. The arrangement is made watertight by a sealing element 92 which fits within a peripheral groove in the closure 82.

The underside of the closure 82 adjacent the annular passage 84 includes an internally threaded boss to receive the upper threaded end of the tie member 80. The boss is also provided with a passage 94 which communicates with a lateral passage 96 located in the top of the housing inner wall 62. As will be seen, these passages provide a path for RO reject water to flow into the right chamber 66.

Figure 8:
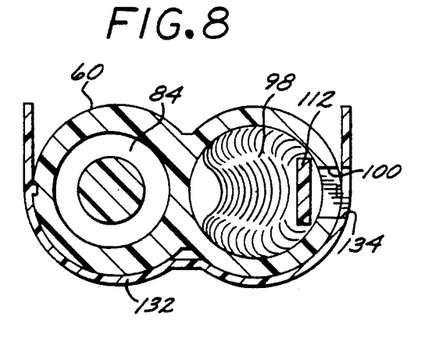
FIG. 8 is a view taken along the line 8—8 of FIG. 6.
Figure 9:
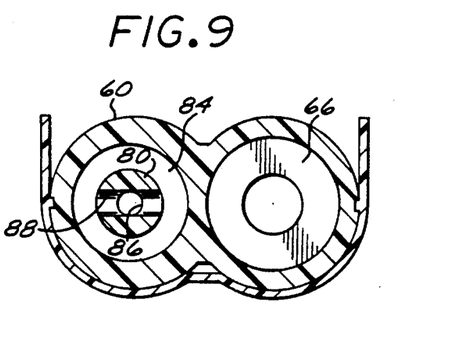
FIG. 9 is a view taken along the line 9—9 of FIG. 6.

The wall of the chamber 66 located to the right in FIG. 6 is molded to integrally include a deflector wall 98 which has two important functions. As best seen in FIGS. 6 and 8, the wall 98 extends inwardly and downwardly from the chamber wall to a position located above the bottom of the chamber, and spaced from but closely adjacent the inner wall 62. From its root end to its tip end its upper surface is concave to accept a falling stream of water and smoothly direct it for discharge out of the air gap apparatus 26.

The chamber wall above the deflector wall 98 is provided with a vertical opening at least one inch high, in accordance with applicable plumbing codes, to define an air gap opening 100. A similar but smaller opening is provided in the chamber wall below the deflector wall 98 to define an overflow or backflow opening 102. The size and configuration of these openings 100 and 102 can be varied as required.

The upper end of the right chamber 66 carries a generally cylindrical nozzle fitting 104 having a passage 106 formed in its upper portion in communication with the passage 96 in the housing inner wall 62. The passage 106 opens into a longitudinal passage 108 which extends through the fitting 104 and through a depending nozzle portion 110 of the fitting 104.

The nozzle fitting 104 also includes an integral, depending wall 112 which rests at its lower extremity upon or just above the upper surface of the deflector wall 98. The wall 112 is in overlying but spaced relation relative to the air gap 100 in order to allow air to pass freely through the air gap 100, around wall 112 and into the interior of the right chamber 66, while yet preventing water from the nozzle portion 110 from splattering out of the air gap 100.

The nozzle fitting 104 includes a peripheral groove to receive a sealing element or O-ring 114 to provide a sealing relationship with the housing 58. In addition, the fitting 104 includes a longitudinal vent opening 116. The resultant venting of the right chamber 66 is in addition to that provided by the air gap 100 and backflow opening 102. It provides yet another assurance that backflow and backsiphonage cannot occur in the system, even if all of the opening 102 and a substantial part of the lower portion of the opening 100 were submerged in polluted water.

The securement of the upper end of the tie member 80 into the upper closure 82 firmly secures together the housing 58, the inlet fitting 72, and the upper closure 82, which is integral with the nozzle 110.

Figures 10, 11, 12, 13:
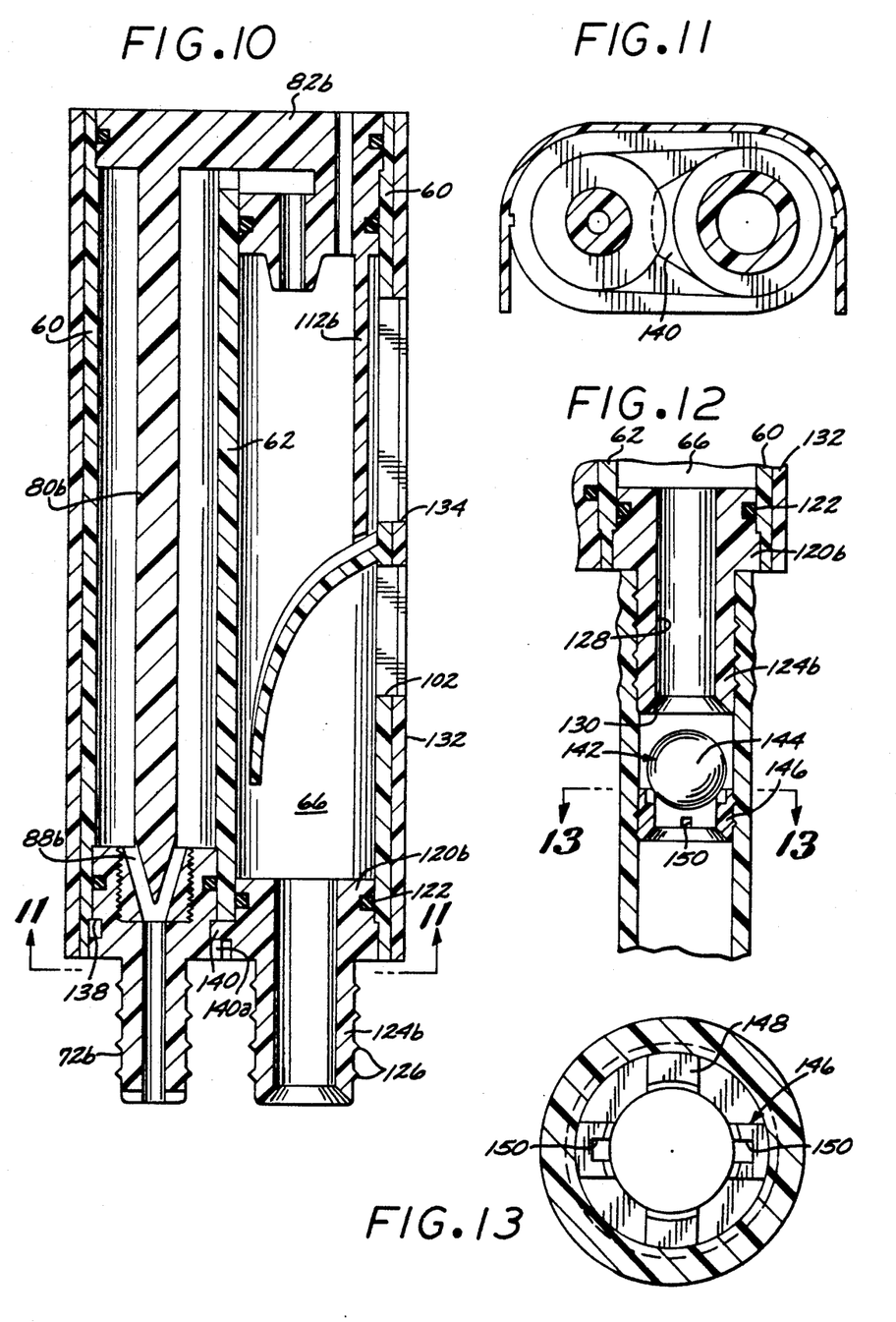
FIG. 10 is an enlarged longitudinal cross sectional view of an air gap apparatus similar to that of FIG. 4 except for the manner of mounting the end closures to the housing.
FIG. 11 is a view taken along the line 11—11 of FIG. 10.
FIG. 12 is an enlarged longitudinal cross sectional view of an improved check valve coupled by means of a conduit to the outlet fitting of the air gap apparatus of FIG. 6.
FIG. 13 is a view taken along the line 13—13 of FIG. 12.

A generally cylindrical outlet fitting 120 is fitted into the open lower end of the right chamber 66. It includes a peripheral flange which complementally seats upon the chamber shoulder 70 to locate the fitting 120 in position. A sealing member or O-ring 122 is received within a peripheral groove in the fitting 120 to provide a watertight seat with the housing 58. Fitting 120 may be secured in position by a suitable adhesive, ultrasonic welding, or by a set screw. However, the use of a cam like the cam 140 of FIG. 11 is preferred because it enables easy disassembly for service or repair.

The fitting 120 includes a depending connector portion 124 having gripping ridges 126 like the ridges 78 of the inlet fitting 72. These enable a sealing connection with the resilient plastic material of the air gap outlet conduit 30 which is illustrated in FIGS. 1–3.

The fitting 120 also includes a longitudinal passage 128 communicating at its upper end with the right chamber 66 and at its lower end with a suitable concave check seat 130.

A vertically extending, generally U-shape escutcheon 132 is snap fitted in overlying relation to the housing 58. Its rearwardly extending sides include longitudinally extending ridges 133 which snap into complemental grooves provided in the outer surfaces of the sides of the housing 58. This holds the escutcheon in place. The escutcheon includes openings 134 and 136 which are approximately aligned with the air gap 100 and backflow opening 102, respectively, so that the presence of the escutcheon does not interfere with the function of the air gap or the backflow openings.

In those instances where it would be desirable for the apparatus 26 to be mounted on the outside of a wall or partition for ready inspection and maintenance, each of the inlet and outlet fittings 72 and 120 can be configured as a 90 degree elbow. The horizontal portions of the elbows would then project interiorly of the wall or partition for connection to the air gap inlet conduit 24 and the air gap outlet conduit 30, respectively.

In operation of the air gap apparatus, the reject water from the RO system passes through the air gap inlet conduit 24, through the inlet passage 86 of the inlet fitting 72, through the lateral passage 88 in the tie member 80, through the passages 94, 96, 106 and 108 into the right chamber 66.

The water stream from the nozzle portion 110 is smoothly channeled and directed by the deflector wall 98 toward the outlet fitting 120, and the wall 112 prevents any random droplets of water from splattering out of the air gap 100.

Assuming a condition of backflow because of a blockage in the drainage system coupled to the outlet fitting 120, the water will either rise slowly and pass out of the backflow opening 102 or, if the pressure differential which develops is great enough, it will flow upwardly through the fitting 120 with great force in the form of a jet. In prior art air gap apparatus, such a jet could very well bridge the air gap 100, impinge against the nozzle fitting 104, and contaminate the potable water of the RO system. However, in the present apparatus 26 such a jet would be almost completely intercepted by the deflector wall 98, and be shunted out of the backflow opening 102.

In the event of backsiphonage, the same shunting action occurs and, in addition, the siphon is broken by the presence of the air gap 100, as well as by the backflow opening 102 and the redundant vent opening 116. Thus, under most conceivable conditions of operation the apparatus 26 will be effective to prevent contamination of the potable water of the RO system, and should be considerably more effective than prior art air gap apparatus.

FIGS. 10–11 illustrate a form of air gap apparatus which is substantially identical to the air gap apparatus 26 just described. Accordingly, identical parts will be assigned identical numerals, and similar parts will be assigned the same numerals with the subscript "b". The major difference between this embodiment and the previous embodiment is the manner of component interconnection.

More particularly, the upper closure 82b includes the integral, downwardly extending tie member 80b having the threaded end, while the inlet fitting 72b includes the complemental threaded opening into which the end of the tie member 80b is threaded. Instead of a lateral passage through the tie member to provide communication with the left chamber 64, a V-shape passage 88b is provided. One other difference is the provision of an annular groove 138 in the inlet fitting 72b. This groove receives a radially outwardly extending lobe or locking portion 140 which is integral with the outlet fitting 120b.

The fitting 120 can be rotated to locate the locking portion 140 in locking position, as illustrated, or it can be rotated to allow the fitting 120b to be withdrawn from the housing 58 by pulling it outwardly against the bias of the O-ring 122. In its locked position the fitting 120b cannot be withdrawn because of the interconnection between the inlet fitting 72b and the upper closure 82b. The arrangement thus provides a positive retention of the outlet fitting 120b, as compared to the arrangement of the embodiment of FIGS. 4–9.

Referring now to FIGS. 12 and 13, a check valve 142 is illustrated which is essentially an integral part of the outlet fitting 120 of FIGS. 6–9. When used alone such a check valve does not comply with most plumbing codes but when used with the air gap 100 it can be quite useful. If it fails to completely close because of foreign matter, it will still provide some obstruction to backflow, with the air gap 100 providing backup or supplemental protection. Since the check valve 142 provides absolute protection when it is functioning normally, its use in combination with the air gap 100 is highly desirable to insure that the associated potable water system does not become contaminated, particularly from sudden backflow.

The check valve 142 comprises a ball 144 which is movable upstream to check backflow by engagement with the seat 130 of the outlet fitting 120. The ball 144 is held in position against downstream flow through the air gap outlet conduit 30 by a circular, centrally bored retainer 146.

The retainer 146 includes the same gripping ridges 126 as the outlet fitting 120 so that it can be fitted within the open end of the conduit 30 before the conduit 30 is forced onto the fitting 120. In this regard, the retainer 146 includes four radially extending, circumferentially spaced apart ribs or seats 148 upon which the ball 144 rests during normal water flow downstream past the ball. Such downstream flow takes place through the retainer 146 between the seats 148.

As best seen in FIG. 13, two of the seats 148 include slots 150 into which a screwdriver can be inserted to facilitate rotation and forcible insertion of the retainer 146 into the conduit 30. Similar screwdriver slots are provided in the opposite end of the retainer 146 so the retainer can be inserted from either direction.

The specific gravity of the ball 144 can be chosen so that it will sink onto the seats 148, which would insure an open passage for even the slowest flowing reject water, but this would also allow slowly rising backflow water to move up into the air gap apparatus 26. If this is not desired, the ball 144 could be made of a material which would cause it to float on slowly rising backflow water, and engage upon the seat 130. However, the ball 144 would react to any significant downstream flow of reject water by moving off the seat 130 and allowing such flow.

Figure 14:
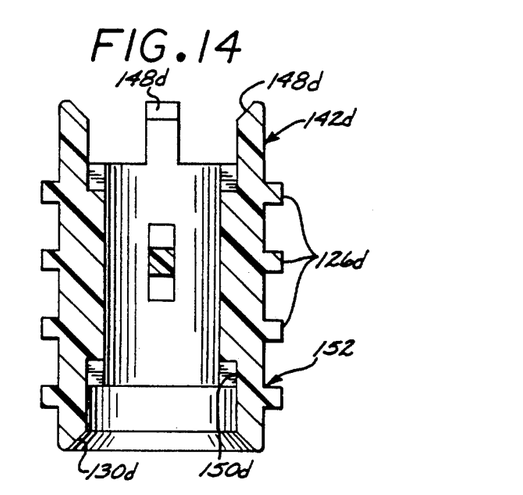
FIG. 14 is an enlarged cross sectional view of one half of yet another form of check valve adapted to be inserted within adjacent sections of conduit.
Figure 15:
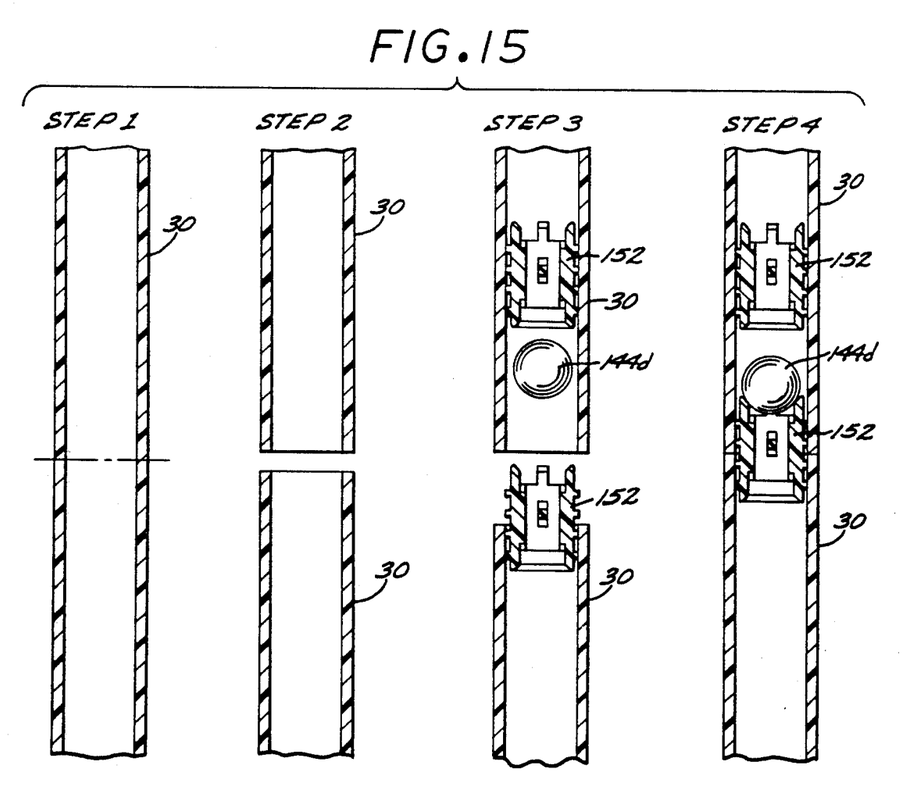
FIG. 15 illustrates four steps in placing the check valve of FIG. 14 within adjacent sections of conduit to couple them together.

Referring now to FIGS. 14 and 15, yet another form of check valve 142d is illustrated. The valve 142d comprises two identical components 152 which, depending upon their orientation within the associated conduit 30, serve either as a seat for the ball or valve element 144d or as a retainer for it. As will be seen, however, the valve 142d also is adapted to be inserted anywhere in a conduit, thereafter acting as a connector for the adjacent conduit sections.

The valve 142d comprises a cylindrical body having on its outer surface a plurality of longitudinally spaced, circumferential gripping ridges 126d of square cross section, as illustrated in FIG. 15. The lower end of the body includes a concave valve seat 130d, and the upper end includes four circumferentially spaced apart, radially disposed retainer seats 148d adapted to retain the ball 144 while allowing a free downstream flow of water through the valve 142d.

FIG. 15 illustrates the steps for inserting the valve 142d where desired. The conduit 30 of step 1 is cut into two sections, as seen in step 2, and the two components 152 and the ball 144d are positioned within the open cut ends as shown in step 3. The conduit sections are then urged together as seen in step 4, the gripping ridges 126d firmly holding the components in position without any need for hose clamps or the like to keep the conduit sections from separating.

Figure 16:
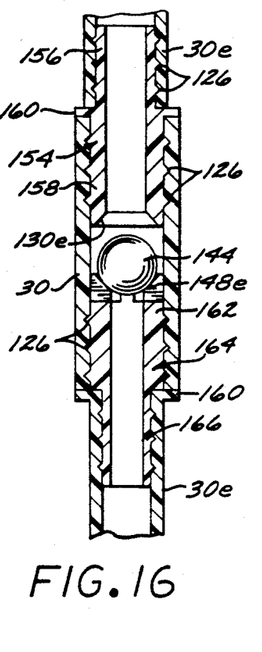
FIG. 16 is a longitudinal cross sectional view of a coupling means for connecting conduit sections of different diameters, and incorporating a check valve as well.

FIG. 16 illustrated a form of check valve which is similar in operation to that of FIGS. 14 and 15 except that it also facilitates association of the check valve with smaller diameter conduit sections 30e. The valve comprises a valve body 154 having a smaller diameter connector portion 156 located within one of the sections 30e, and a larger diameter connector portion 158 located within the larger diameter conduit section 30. An integral circumferential locating flange 160 allows the installer to gauge when the conduits are properly positioned relative to the check valve.

The inner end of the connector portion 158 includes the valve seat 130e, while the retainer seats 148e comprise the inner end of a large diameter connector portion 162 of a valve body 164. The portion 162 is fitted within the conduit 30, and a smaller diameter connector portion 166 of the valve body is disposed within the other smaller diameter conduit section 30e. It is noted that the arrangement is adapted to interconnect a number of different sizes of conduits, as illustrated. Obviously, where the use of a check valve is not desired, the ball 144 can be omitted and the arrangement will still provide such interconnections.

The foregoing arrangement allows insertion of the check valve in cut apart smaller diameter conduit sections, and the check valve also functions to hold these sections together after the valve is inserted. In this regard, the larger conduit section 30 is a convenient and readily available component to facilitate this function.

Figure 17:
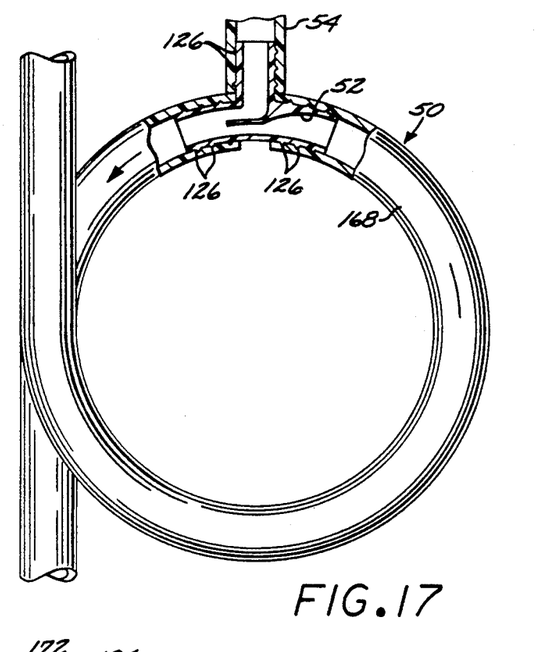
FIG. 17 is a front elevational view, partially in section, of a trap formed out of conduit, incorporating a coupling and venting tee, and adapted for use in association with the present air gap apparatus.
Figures 18, 19:
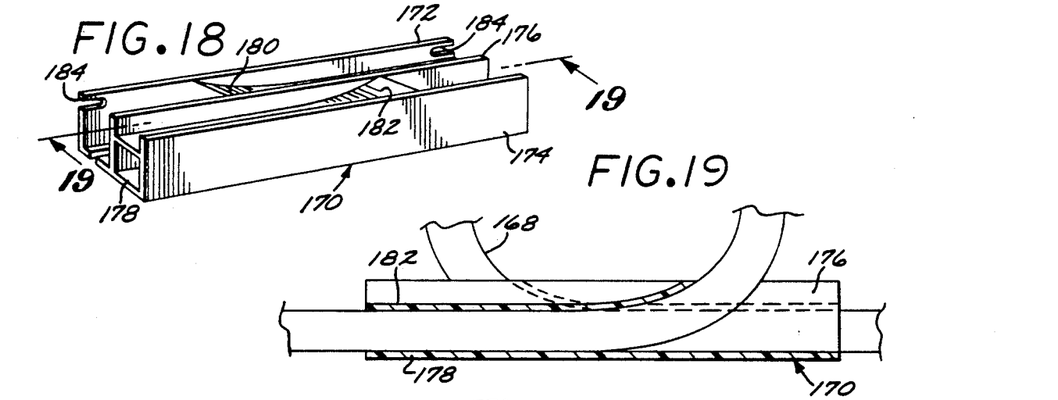

FIGS. 17-19 illustrate the trap 50, which can be used in conjunction with the air gap apparatus 26 in certain situations, or the trap can be used without also installing the apparatus 26 if an air gap device is already installed or there does not appear to be a need for an air gap device.

The trap 50 is relatively inexpensive and simple in construction, being made of a length of flexible plastic conduit 168 formed into a loop, the special "T" fitting 52 disposed in the upper portion of the loop, and a mounting bracket 170 to hold the loop in position and enable the assembly to be mounted to a wall or the like. The diameter of the loop can be changed, if desired, and its orientation on the wall can also be changed.

Fitting 52 is installed by cutting the top of the loop of conduit and inserting the lateral straight or precurved branches of the fitting 52 into the cut ends. These branches include the gripping ridges 126 to hold the branches in position and to hold the cut conduit ends together. The upper or middle branch of the fitting 52 is insertable into the lower end of the standpipe 54, which is seen in FIGS. 2 and 3.

The free ends of the conduit loop 168 are disposed within adjacent channels of the elongated, generally rectangular cross section bracket 170. The channels are formed by inside and outside walls 172 and 174 and an intermediate wall 176 which are integral with a base 178. A clamping wall 180 extends inwardly from one end of the bracket 170 in overlying, spaced relation to the base 178. A similar wall 182 extends inwardly from the opposite end of the bracket in similar overlying relation to the base. The inward ends of the walls are formed so that they are biased toward the base 178.

Consequently, when one of the free ends of the conduit loop 168 is inserted in the space between the base 178, the walls 172 and 176, and the overlying wall 180, the bias of the wall 180 maintains the loop free end in position. Likewise, the other free end of the loop is maintained in position between the base 178, the walls 176 and 174, and the overlying wall 182.

The bracket 170 includes suitable slots 184 to facilitate mounting of the bracket to the wall 16 or to the back of the dispenser, water cooler, etc., using suitable fasteners (not shown).

Figure 20:
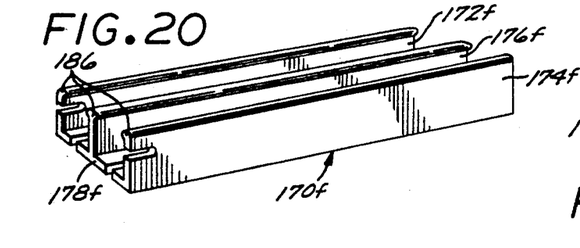
FIG. 20 is a perspective view of a second form of trap bracket for mounting the trap of FIG. 17.
Figure 21:
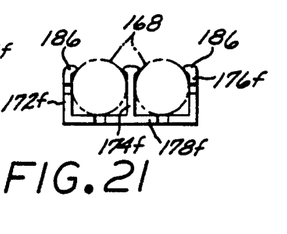
FIG. 21 is an end elevational view of the trap bracket of FIG. 20.

FIGS. 20 and 21 illustrate another form of mounting bracket 170f which is substantially identical in operation to the bracket 170 of FIGS. 18 and 19, and the previously indicated numbering convention will be followed to show identity and similarity.

The bracket 170f comprises similar walls 172f, 174f and 176f, and base 178f. However, retention of the free ends of the loop 168 is accomplished by enlarged upper edge portions or retention beads 186 formed in the walls 172f, 174f and 176f. The lateral spaces between adjacent beads 186 is made less than the diameter of the conduit of the loop 168 so that the conduit must be forcibly seated within the channels of the bracket, thereby rendering inadvertent unseating of the conduit loop unlikely.

The foregoing components can be combined in a variety of ways, depending upon the particular application. The applications of FIGS. 1-3 are merely exemplary, and illustrate in part the utility of making available such components in kit form for easy association with an RO system, for example.

Thus, in the RO system of FIG. 1, reject water from the RO unit 10 flows through the air gap inlet conduit 24 to the air gap apparatus 26. As seen in FIG. 6, the water path is through the left chamber 64 and into the nozzle fitting 104. The air gap provided in the right chamber 66 prevents any backsiphoning of the reject water up into contact with the fitting 104. Equally important, the deflector wall 98 prevents any high velocity backflow from bridging the air gap and coming into contact with the fitting 104. The opening 102 also provides an escape path for such backflow if that is needed.

The presence of the check valve 142 in the air gap outlet conduit 30 provides added assurance against backflow, as previously described, whether such backflow if slowly rising water or a high velocity rush of water. Since the system of FIG. 1 uses a conventional "P" trap 20, there is no need for the trap 50 discussed above. Of course, even though redundant, the trap 50 could be used as well.

In the arrangement of FIG. 2, the operation of the air gap apparatus 26 is the same, the difference being that there is no "P" trap and consequently the trap 50 and its venting coupling are utilized, but preferably in conjunction with a check valve 48 which is like the check valve 142, and inserted in the conduit in the same way.

The system of FIG. 3 is somewhat different from that of FIG. 2. It is an RO cooler 10b having two vent pipes 54 and 56, and also the trap 50 and the two check valves 48b and 48c illustrated. These components are supported by the conduit 24, which extends through and rests upon the margins of an opening provided in the back wall of the cooler. Also, the drain cup is located in the top of the cooler.

The second check valve 48c provides an added level of protection against any backflow which might contaminate the system, particularly in the vicinity of the air gap 100. Thus, to contaminate the system a backflow would have to somehow pass through the check valve 48c, in which case it would probably flow out of the stand pipe 54, since this would be an easier path than passing through the other check valve 48b. Even if the backflow reached the check valve 48b, it would preferentially flow out of vent pipe 56 before it would flow past the check valve 48b and into the chamber 66, and even then would flow out of the special opening 102 before it contaminated the air gap 100. In this regard, the check valves are characterized by little or no resistance to downstream flows of water, since such water is flowing only under the influence of gravity. On the other hand, the valves quickly seat and obstruct any reverse flow.

From the foregoing it can be seen that the present air gap apparatus provides a usual air gap function, but unlike prior art air gap devices it also provides additional levels of protection against system contamination through either slow rising or high velocity contaminated water backflow.

Such a backflow is diverted externally of the air gap apparatus before it is able to contaminate the potable water system upstream of the air gap 100. Further, the air gap apparatus is sufficiently straightforward and compact in design that it can be conveniently packaged as a kit for original installation as a part of an RO system, or for after fitting to such a system. The kit preferably would incorporate the improved check valves and traps in the configurations disclosed for the applications described, but such components can of course be reconfigured as required to best suit them for other applications.

While several forms of the invention have been illustrated and described, it will be apparent that various modifications can be made without departing from the spirit and scope of the invention.

What is claimed is:

1. Air gap apparatus for connection between the waste water outlet conduit of a reverse osmosis unit, and an air gap outlet conduit of a drainage system, the air gap apparatus comprising:

- a housing having an outer wall and an inner wall defining a pair of adjacent, elongated, open ended left and right chambers;
- an inlet fitting having an inlet passage mounted within the lower end of the left chamber, and an outlet fitting having an outlet passage mounted within the lower end of the right chamber, the inlet fitting being adapted for coupling to the waste water outlet conduit of the reverse osmosis unit, and the outlet fitting being adapted for coupling to the air gap outlet conduit of the drainage system;
- a closure mounted within the upper portion of the housing and overlying the upper ends of the left and right chambers, the closure and housing defining a connecting passage providing fluid communication between the upper ends of the left and right chambers;
- a nozzle fitting mounted within the upper end of the right chamber and having a nozzle passage in fluid communication with the connecting passage, the nozzle fitting including a depending splatter shield; and
- the outer wall of the housing including an air gap adjacent the splatter shield to vent the right chamber to atmosphere and prevent back siphonage into the right chamber of waste water from the outlet fitting, the outer wall further including an inwardly and downwardly directed deflector wall located below the lower terminus of the air gap, and also including a backflow opening located adjacent the deflector wall and opening into the right chamber to direct out of the backflow opening any waste water which backflows upwardly against the deflector wall from the outlet fitting.

2. Air gap apparatus according to claim 1 wherein the closure and nozzle fitting include supplemental vent passage means providing communication between the right chamber and atmosphere.

3. Air gap apparatus according to claim 1 wherein the closure includes a threaded opening and the inlet fitting includes a tie member extending upwardly within the left chamber and terminating in a threaded extremity fitted into the threaded opening in the closure to connect the closure and inlet fitting together, the tie member including passage means affording fluid communication between the inlet passage and the left chamber.

4. Air gap apparatus according to claim 1 wherein the inlet fitting includes a threaded opening and the closure includes a tie member extending downwardly within the left chamber and terminating in a threaded extremity fitted into the threaded opening in the inlet fitting to connect the closure and inlet fitting together, the tie member including passage means affording fluid communication between the inlet passage and the left chamber.

5. Air gap apparatus according to claim 1 wherein each of the inlet and outlet fittings includes a connector portion adapted to be forcibly fitted within the interior of semiflexible tubing, and having a plurality of longitudinally spaced apart, circumferentially continuous gripping ridges for engagement with the inner wall of the tubing to constrain the fitting against longitudinal separation from the tubing and to provide a fluid tight fit.

6. Air gap apparatus according to claim 1 wherein the inlet fitting includes a lateral detent, and the outlet fitting includes a laterally extending locking portion which is receivable within the detent upon rotation of the outlet fitting to thereby removably lock the outlet fitting in position relative to the housing.

7. Air gap apparatus according to claim 1 wherein the outlet fitting includes a connector portion having a check valve seat, and including an air gap outlet conduit made of semiflexible tubing fitted over the connector portion, a valve retainer having a central passage fitted within the tubing, and a ball check valve supported upon the valve retainer and operative upon a backflow of waste water to engage the check valve seat and prevent the waste water from flowing into the right chamber.

8. Air gap apparatus according to claim 7 wherein the connector portion is adapted to be forcibly fitted within the interior of the tubing, and wherein the connector portion includes a plurality of gripping ridges for engagement with the inner wall of the tubing to constrain the fitting against longitudinal separation from the tubing and to provide a fluid tight fit.

9. Air gap apparatus according to claim 8 wherein the gripping ridges are longitudinally spaced apart, circumferentially continuous, and generally triangular in cross section.

10. Air gap apparatus according to claim 8 wherein the valve retainer also includes the ridges, and further includes radial slots for receiving the blade of a screwdriver to facilitate forcible fitting of the valve retainer within the tubing to constrain the valve retainer against longitudinal separation from the tubing and to provide a fluid tight fit.

11. Air gap apparatus according to claim 1 and including adjacent lengths of semiflexible tubing located in the drainage system downstream of the outlet fitting, and including a check valve seat forcibly fitted within the interior of the upstream one of the lengths, the check valve seat including a plurality of gripping ridges for engagement with the inner wall of the tubing to constrain the check valve seat against longitudinal separation from the tubing, and further including a valve retainer forcibly fitted within the interior of the downstream one of the lengths, the valve retainer including a plurality of gripping ridges for engagement with the inner wall of the tubing to constrain the valve retainer against longitudinal separation from the tubing, a portion of the valve retainer extending upstream into the upstream one of the lengths to constrain the lengths against longitudinal separation from one another, and a ball check valve located between the check valve seat and the valve retainer.

12. Air gap apparatus according to claim 11 wherein the gripping ridges on the check valve seat and the valve retainer are, respectively, longitudinally spaced apart, circumferentially continuous and of generally triangular cross section.

13. Air gap apparatus according to claim 11 wherein the check valve seat and the valve retainer are substantially identical, one end including a valve seat portion and the other end including a ball check valve support portion.

14. Air gap apparatus according to claim 1 and including adjacent lengths of semiflexible tubing of relatively small diameter located in the drainage system downstream of the outlet fitting, a first body having a central passage and including a connector portion of relatively small outer diameter forcibly fitted within the interior of the upstream one of the lengths and further having a connector portion of relatively large outer diameter provided with a valve seat, a length of semiflexible tubing of relatively large diameter forcibly fitted over the connector portion of relatively large diameter, a valve retainer forcibly fitted within the interior of the tubing of relatively large diameter, a ball check valve located between the valve seat and the valve retainer, a second body having a central passage and including a connector portion of relatively large diameter forcibly fitted within the interior of the tubing of relatively large diameter downstream of the valve retainer, and further including a connector portion of relatively small diameter forcibly fitted within the interior of the downstream one of the lengths.

15. An air gap apparatus according to claim 1 and including a trap located in the drainage system downstream of the outlet fitting, the trap comprising a length of semiflexible tubing formed into an inlet section, an outlet section and an intervening loop section; a mounting bracket receiving and holding the inlet and outlet sections in adjacent fixed relation; and a vent at the top of the loop providing communication between the interior of the loop section and atmosphere.

16. An air gap apparatus according to claim 15 wherein the mounting bracket includes first walls defining adjacent channels for receiving and holding the inlet and outlet sections, respectively, and further includes second walls overlying the channels and biased against the inlet and outlet sections to constrain the sections against movement relative to the mounting bracket.

17. Air gap apparatus according to claim 16 and further comprising a check valve located in the drainage system downstream of the trap.

18. An air gap apparatus according to claim 15 wherein the mounting bracket includes walls defining adjacent channels for receiving and holding the inlet and outlet sections, respectively, the walls including enlarged bead portions overlying the sections and narrowing the widths of the channels to constrain the sections against separation from the channels.

19. An air gap apparatus according to claim 15 wherein the loop section includes a pair of adjacent portions, and the vent comprises a stand pipe made of semiflexible tubing, and further comprises a T-shape fitting having an upper connector portion forcibly fitted within the interior of the stand pipe, and a pair of lateral connector portions forcibly fitted within the interiors of the adjacent portions of the loop section, respectively.

20. Air gap apparatus according to claim 19 wherein the T-shape fitting includes an interior wall directed inwardly and in a downstream direction whereby the wall tends to direct backflowing waste water out of the stand pipe.

21. Air gap apparatus according to claim 15 and further comprising a first check valve connected downstream of the outlet fitting and upstream of the trap.

* * * * *